March 3, 1936.  G. H. ZENNER  2,032,681

GAUGE

Filed March 18, 1933

INVENTOR
GEORGE H. ZENNER
BY
*E L Greenewald*
ATTORNEY

Patented Mar. 3, 1936

2,032,681

UNITED STATES PATENT OFFICE 2,032,681

GAUGE

George H. Zenner, Buffalo, N. Y., assignor to The Linde Air Products Company, a corporation of Ohio Application March 18, 1933, Serial No. 661,454

6 Claims. (Cl. 73—54)

This invention relates to gauges and more particularly relates to a gauge for measuring the liquid level of volatile fluids contained in vessels and subjected to relatively high pressures.

Level gauges previously used in measuring the liquid levels of volatile fluids in pressure vessels have had a single partition separating a gas phase chamber from a liquid phase chamber, these chambers being of unequal size. When the liquid phase chamber of the gauge has been made larger than the gas phase chamber, abrupt reductions in pressure in the fluid-containing vessel have forced or blown the measuring liquid in the gauge into the upper chamber and out into the gas phase connection to the pressure vessel. The measuring liquid when blown in this manner is apt to freeze in important connecting lines because of the comparatively high solidifying point of the usual measuring liquids as compared with the low temperatures of liquefied gases such as air, oxygen and the like. Other disadvantages of the prior type gauges are the slow response of the measuring liquid in reaching the correct level when pressure is increased in the pressure vessel and also when the gauge cocks are first opened. A large liquid phase chamber requires the evaporation of a rather large quantity of fluid in the liquid phase line. In liquid oxygen apparatus particularly there is usually not sufficient heat leakage to keep the liquid phase line clear of liquid oxygen for some time after this large amount has been evaporated, so that the gauge temporarily registers incorrect levels.

A primary object of this invention is to provide, in a level gauge, upper and lower chambers of approximately equal volume so as to register correct levels and to prevent excessive blowing of the measuring liquid by sudden surges of pressure.

Another object of this invention is to provide, in a level gauge, a separator tube connecting the upper and lower chamber for preventing the measuring liquid from being forced into the gas phase line and into the pressure vessel.

Figure 1:
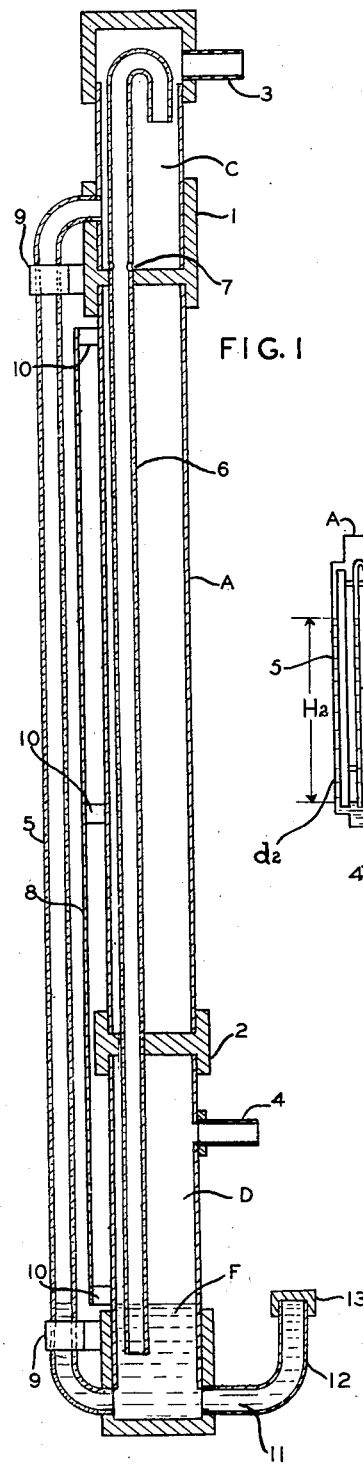
Figure 2:
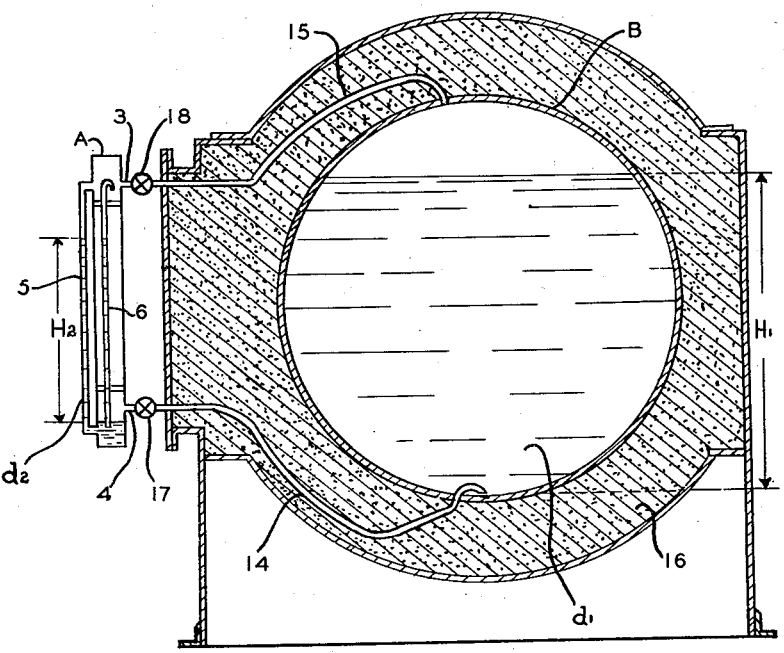

The above and other objects, together with the novel features of this invention, will be apparent from the following description and the accompanying drawing, of which Fig. 1 is a view showing a level gauge, illustrating one embodiment of this invention, as assembled for connection with a pressure vessel; and Fig. 2 is a schematic view showing the gauge in position and connected with a pressure vessel.

The level gauge comprises a relatively long cylinder or casing A closed at either end and provided with two separating partitions 1 and 2 which divide the cylinder so as to form compartments including an upper chamber C and a lower chamber D. The upper chamber C is connected by an outlet 3 with the gas phase side or top of a pressure vessel B, and the lower chamber D is connected by an outlet 4 with the liquid phase side or the bottom of the vessel B. These two chambers are so designed that their volumes will be substantially equal after a measuring liquid F has been added to the lower chamber. The chambers are directly interconnected by a vertically disposed glass gauge tube 5 extending outside of cylinder A from the bottom of chamber D to the side of chamber C. The gauge tube permits the measuring liquid to indicate visibly the difference in pressures between the gas phase side and the liquid phase side of the pressure vessel. This pressure difference is dependent on the head of the liquid in the pressure vessel B and is accordingly a measure of that head.

The substantially equal volumes of chambers C and D prevent sudden changes in pressure in the vessel B from blowing the measuring liquid out through the outlets 3 and 4. If the lower chamber D were larger than the chamber C, in case of a blow down of the vessel B the pressure would drop faster in chamber C, suddenly causing a large differential in pressure which would tend to blow the measuring liquid into the upper chamber C.

In further accord with this invention and as an additional means for preventing measuring liquid from being blown into the vessel B, a separator tube 6 is provided within the cylinder A and connecting the two chambers. The tube 6 is tightly sealed against leaks where it passes through the partitions 1 and 2. The measuring liquid will blow into space C through both tubes 5 and 6. However, when sufficient liquid has passed out of space D so that the end of tube 6 is exposed, the excess gas causing the high differential pressure will blow through the tube 6 instead of through the gauge glass 5, which has its lower end still sealed. The upper end of the separator tube is bent sharply in reverse bend for directing liquid downward and away from the outlet 3. Liquid forced through the tube 6 will thus fall back onto the top surface of the partition 1. The tube 6 may be provided with small holes 7 just above the partition 0 for allowing the liquid to flow back down the separator tube into the chamber D when the pressures have become equalized.

It is preferred to employ as a measuring liquid a halogenated hydrocarbon or a suitable, relatively dense liquid which is unaffected by oxygen. Regardless of the position of the gauge with respect to the pressure vessel B the height of liquid in the vessel will be registered by the height of liquid in the gauge glass 5. A graduated scale 8 may be inserted behind the gauge glass so that readings may be made directly. The height of the scale is to the depth of liquid in the vessel inversely as the density of the measuring liquid is to the density of the liquid in the vessel. For this reason the gauge may be considerably shorter than the depth of the vessel B.

In equation form:

$$H_1 d_1 = H_2 d_2 \text{ or } \frac{H_1}{H_2} = \frac{d_2}{d_1},$$

where $H_1$ is the depth of liquid in vessel B, $H_2$ is the height of measuring liquid; $d_1$ is the density of the liquid in vessel B; and $d_2$ is the density of the measuring liquid.

The gauge glass 5 and the graduated scale 8 are secured to the casing in any suitable manner, as for example by metal strips 9 and 10 respectively.

An additional outlet 11 may be made in the bottom of chamber D and connected with a short length of tubing 12 bent to a vertical position. The tubing 12 is preferably arranged so that the top of the tubing will indicate the correct level for the measuring liquid when not under pressure. The tubing 12 is closed by a suitable cap 13. The measuring liquid may be removed from the gauge by this outlet 11 when it becomes necessary to repair the gauge.

As shown in Fig. 2 the liquid phase outlet 4 is connected with the bottom of the pressure vessel by a tube or conduit 14, a portion of which may be disposed adjacent the outer surface of the vessel as shown. The tube 14 is arranged so that it stands full of gas under substantially all conditions by reason of the heat which inevitably leaks into the tube past the insulation, and vaporizes the liquid escaping to the gauge. The pressure in the conduit 14 is subject to the weight of the liquid in the vessel in addition to the pressure of the vapor of the liquid. The pressure in the lower conduit and in the bottom of the gauge is therefore greater than that in the conduit 15, which leads from the top of the vessel to the outlet 3 of the gauge, and the difference in pressure is measurable in amount in exact accordance with the height of the liquid in the vessel.

Both the tubes 14 and 15 are kept for nearly their entire length within a chamber 16 which completely encloses the pressure vessel. The chamber 16 is filled with an insulating material in order that heat from atmospheric air may be prevented from unduly increasing the pressure in the vessel B and particularly in the tubes 14 and 15.

Although a preferred form of this invention has been described and illustrated it will be understood that changes may be made without departing from the scope of this invention.

I claim:

1. In a device for measuring differences of hydrostatic pressure, the combination of a casing having an upper chamber and a lower chamber therein, said lower chamber being adapted to contain a liquid and being filled therewith to a level so that the space above the fluid and the space in the upper chamber are substantially equal in volume; means connecting said respective chambers to the points between which the pressure difference is to be obtained; and means for measuring the pressure difference between the two chambers; said chamber sizes being adapted to prevent sudden changes in pressure from affecting the accuracy of said measuring means.

2. In a device for measuring differences of hydrostatic pressure, the combination of a casing having a pair of chambers of substantially equal volume said chamber volumes being adapted to prevent sudden changes in pressure from blowing the measuring liquid out of said tube; conduits connecting said chambers to the points between which the pressure difference is to be obtained; a gauge glass vertically disposed between said chambers; and a measuring liquid for indicating the pressure difference between the two chambers.

3. A gauge for measuring the liquid level of a volatile fluid in a closed vessel comprising a casing having an upper chamber, means connecting said upper chamber with the gas phase side of said fluid and a lower chamber adapted to contain a measuring liquid for indicating the pressure difference between said chambers, said lower chamber having a volume substantially equal to that of said upper chamber, said lower chamber being adapted to be subjected to the liquid phase side of said fluid; a liquid level viewing tube connecting said chambers; said chamber sizes being adapted to prevent sudden changes in pressure in said vessel from blowing the measuring liquid out of said tube.

4. In a device for measuring differences of hydrostatic pressure, the combination of a casing having an upper chamber and a lower chamber of substantially equal volume; conduits connecting said chambers to the points between which the pressure difference is to be obtained; means including a liquid for measuring the pressure difference between said chambers; a tube connecting the two chambers, and having a reverse bend in the upper chamber for directing the liquid away from the upper of said conduits when forced upward by a sudden change of pressure; and said tube having means for draining the liquid back into the lower chamber.

5. A gauge for measuring the level of a volatile liquid in a closed vessel comprising a casing having an upper chamber and a lower chamber; means connecting said chambers to the top and bottom respectively of said closed vessel; a gauge glass vertically disposed between said chambers and adapted to contain a measuring liquid for indicating the difference in pressure at the top and at the bottom of the closed vessel, said chambers having substantially equal volumes so as to minimize fluctuations of the gauge reading when the pressure within said vessel changes suddenly; and a separating tube joining the two chambers for preventing the loss of measuring fluid.

6. A gauge of the class described comprising a first chamber adapted to be connected to a point of lower pressure, a second chamber below said first chamber and having a volume exceeding said first chamber by the volume of the measuring liquid normally in said second chamber, said second chamber being adapted to be connected to a point of higher pressure, a measuring tube connecting said chambers, a measuring liquid in said tube and the second chamber in such amount that the remaining volume within said second chamber equals the volume of said first chamber, so as to minimize fluctuations of the measuring liquid within said tube in response to sudden variations in pressure, and means for returning said measuring liquid from the bottom of the first chamber to the second chamber.

GEORGE H. ZENNER.